US011142211B1

(12) United States Patent
Makilya et al.

(10) Patent No.: US 11,142,211 B1
(45) Date of Patent: Oct. 12, 2021

(54) VEHICLE RIDER BEHAVIORAL MONITORING

(71) Applicant: Samsara Networks Inc., San Francisco, CA (US)

(72) Inventors: Hendrika Makilya, Oakland, CA (US); Katherine Heddleston, Truckee, CA (US); Claire Nord, San Francisco, CA (US); Anthony Washington, Atlanta, CA (US); Jennifer Nguyen, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 17/249,828

(22) Filed: Mar. 15, 2021

(51) Int. Cl.
  *B60W 40/08* (2012.01)
  *B60W 50/08* (2020.01)
  *B60W 50/14* (2020.01)
  *G06K 9/00* (2006.01)
  *G10L 15/26* (2006.01)

(52) U.S. Cl.
  CPC .......... *B60W 40/08* (2013.01); *B60W 50/085* (2013.01); *B60W 50/14* (2013.01); *G06K 9/00832* (2013.01); *G10L 15/26* (2013.01); *B60W 2540/01* (2020.02); *B60W 2540/21* (2020.02)

(58) Field of Classification Search
  CPC ....... B60W 2540/22; B60W 2540/221; B60W 2540/223; B60W 2540/229; B60W 2040/0872; G06K 9/00845; B60K 28/06; G10L 15/08; G10L 2015/088
  See application file for complete search history.

(56) References Cited

U.S. PATENT DOCUMENTS

2016/0046298 A1\* 2/2016 DeRuyck .............. B60W 50/14
  340/576
2020/0349666 A1\* 11/2020 Hodge .................... G06F 21/36

\* cited by examiner

*Primary Examiner* — Kenneth J Malkowski
(74) *Attorney, Agent, or Firm* — Schwegman Lundberg & Woessner, P. A.

(57) ABSTRACT

Disclosed are systems, methods, and non-transitory computer-readable media for vehicle rider behavioral monitoring. A behavioral monitoring system uses sensor data received from vehicles to monitor the behavior of the vehicle riders (e.g., vehicle operator and/or vehicle passengers) and performs predetermined actions if undesirable behavior is detected. For example, the behavioral monitoring system can transmit a notification or generate a record if inappropriate language or actions are detected.

17 Claims, 10 Drawing Sheets

VEHICLE RIDER BEHAVIORAL MONITORING

TECHNICAL FIELD

Embodiments of the present subject matter relate generally to vehicles and, more specifically, to vehicle rider behavioral monitoring.

BACKGROUND

Vehicles are used daily to provide a variety of different services. For example, trucks are used to ship items to customer, trains and busses are used to provide public transportation, and police cars are used to patrol neighborhoods. Providing security and safety in relation to use of vehicles provides challenges. Unlike buildings and other physical locations that remain at a single location, vehicle move across multiple locations. As a result, monitoring the behavior of the vehicle operator and passengers is difficult, as is providing a response when undesirable behavior is detected. Accordingly, improvements are needed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
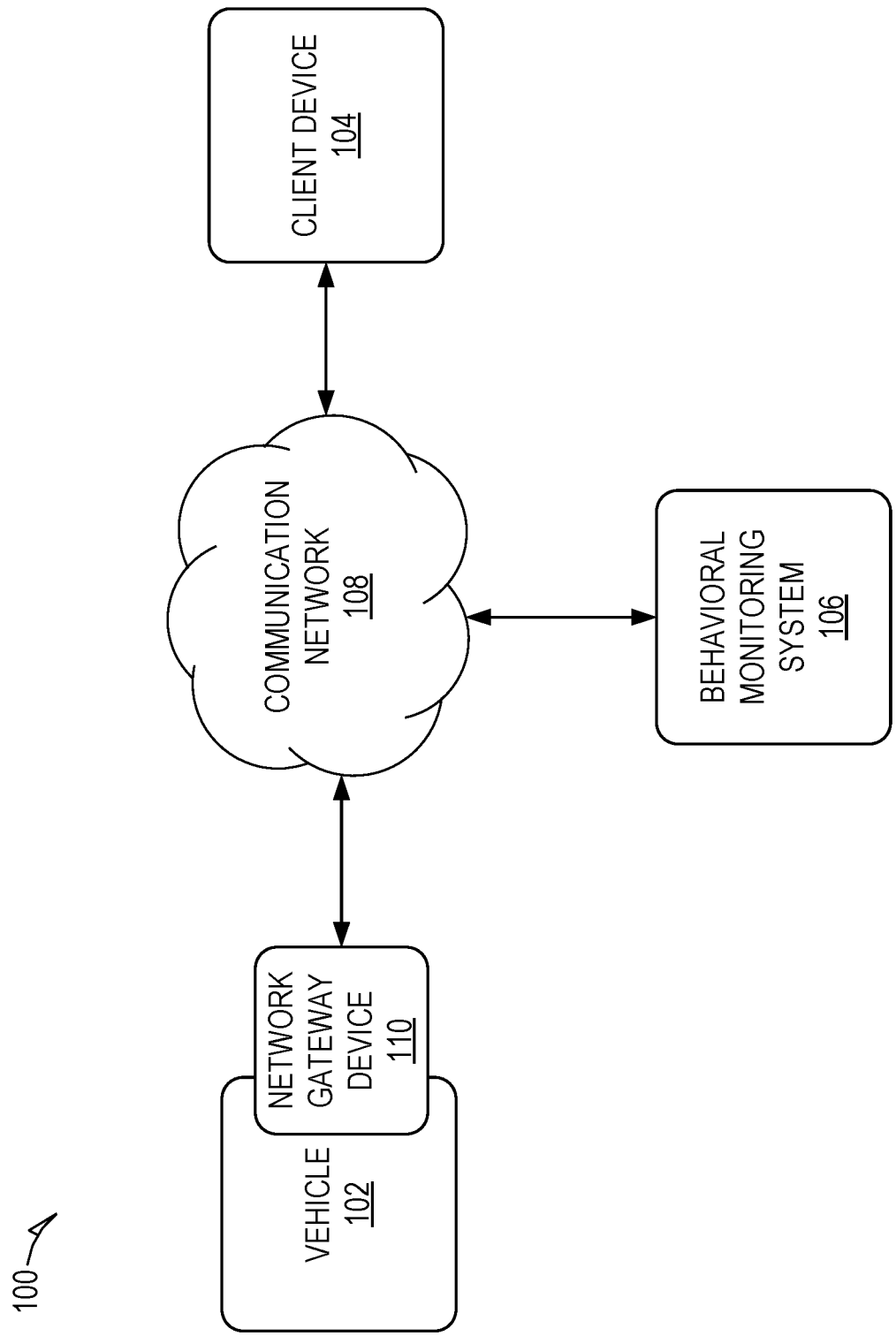
FIG. 1 shows a system for vehicle rider behavioral monitoring, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for vehicle rider behavioral monitoring. A behavioral monitoring system uses sensor data received from vehicles to monitor the behavior of the vehicle riders (e.g., vehicle operator and/or vehicle passengers) and performs predetermined actions if undesirable behavior is detected. For example, the behavioral monitoring system can transmit a notification or generate a record if inappropriate language or actions are detected.

The sensor data may include any type of data describing actions performed by vehicle riders. For example, the sensor data may include image data, video data, audio data, and the like. The behavioral monitoring system uses the sensor data along with a set of triggering conditions to determine whether an undesirable behavior has occurred. Each triggering condition defines one or more individual conditions that, if satisfied, indicates occurrence of an undesirable behavior. For example, a triggering condition may define one or more terms or string of terms that, if spoken, indicate use of offensive, derogatory, and/or otherwise undesirable language. As another example, a triggering condition may define physical motions and motion thresholds that, if performed, indicate violent, dangerous, and/or otherwise undesirable movements.

Each triggering condition may be associated with a corresponding set of response actions to be performed by the behavioral monitoring system if the triggering condition has been satisfied. For example, the response actions may include transmitting alerts to specified users, generating an incident report, modifying a mode of operation of sensors and/or the vehicle, and the like.

FIG. 1 shows a system 100 for vehicle rider behavioral monitoring, according to some example embodiments. As shown, multiple devices (i.e., vehicle 102, client device 104, and behavioral monitoring system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, semi-trailer truck, plane, train, ship, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs), actuators, etc., deployed within the vehicle. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle 102, actions performed by riders in and around the vehicle 102, and the vehicle's 102 surrounding environment. For example, the sensors may include engine speed sensors, fuel temperature sensors, voltage sensors, pressure sensors, radar sensors, light detection and ranking (LIDAR) sensors, imaging sensors (e.g., camera, video camera), audio sensors (e.g., microphones), and the like.

The behavioral monitoring system 106 is a computing system consisting of one or more computing devices configured to provide remote behavioral monitoring of a vehicle 102 to detect undesirable behavior and execute corresponding responses. For example, the behavioral monitoring system 106 may allow a fleet manager and/or authorized administrator to define a set of triggering conditions for detecting and responding to undesirable behavior.

To utilize the functionality of the behavioral monitoring system 106, users (e.g., administrators, fleet managers) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the behavioral monitoring system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, tablets; smart televisions; set-top boxes; and/or any other network enabled computing devices. Hence, the client devices 104 may be of varying type, capabilities, operating systems, and so forth.

A user interacts with a behavioral monitoring system 106 via a client-side application installed on the client device 104. In some embodiments, the client-side application includes a component specific to the behavioral monitoring system 106. For example, the component may be a stand-alone application, one or more application plug-ins, and/or a browser extension. However, the users may also interact with the behavioral monitoring system 106 via a third-party application, such as a web browser or messaging application, that resides on the client device 104 and is configured to communicate with the behavioral monitoring system 106. In either case, the client-side application presents a user interface (UI) for the user to interact with the behavioral monitoring system 106. For example, the user interacts with the behavioral monitoring system 106 via a client-side application integrated with the file system or via a webpage displayed using a web browser application.

As discussed earlier, the behavioral monitoring system 106 enables administrators to generate and/or modify a set of triggering conditions for detecting undesirable behavior. For example, the behavioral monitoring system 106 may provide a user interface that allows administrators to generate the triggering conditions. Each triggering condition defines one or more individual conditions that, if satisfied, indicates occurrence of an undesirable behavior. For example, a triggering condition may define one or more terms or string of terms that, if spoken, indicate use of offensive, derogatory, and/or otherwise undesirable language. As another example, a triggering condition may define physical motions and motion thresholds that, if performed, indicate violent, dangerous, and/or otherwise undesirable movements.

Each triggering condition may also be associated with a corresponding set of response actions to be performed by the behavioral monitoring system 106 if the triggering condition has been satisfied. For example, the response actions may include transmitting alerts to specified users, generating an incident report, modifying a mode of operation of sensors and/or the vehicle, and the like.

The user interface provided by the behavioral monitoring system 106 enables administrators to define the triggering conditions, such as by enabling administrators to define a set of terms or strings of terms that, if spoken, indicate use of offensive, derogatory, and/or otherwise undesirable language. Similarly, the behavioral monitoring system 106 enables an administrator to define the types of motions and thresholds to trigger the triggering condition.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior. For example, the user interface enables the administrator to define a modified mode of operation of the sensors in the vehicle 102 to be initiated to capture additional data for inclusion in the incident report. This may include increasing the number of sensors used to capture data, such as by initiating use of video cameras or microphones, increasing the performance of the sensors that are in use, such as by increasing the resolution used to capture video, and/or modifying the positioning of the sensors, such as by changing the angle or view of a camera to better capture the detected undesirable action.

The behavioral monitoring system 106 uses sensor data received from sensors in the vehicle 102 to detect occurrences of undesirable behavior by the riders of the vehicle 102. For example, the behavioral monitoring system 106 receives sensor data gathered by sensors of the vehicle 102, such as video and/or image data captured by image sensors (e.g., cameras, video cameras), audio data captured by audio sensors (e.g., microphones), motion data captured by motion sensors, and the like.

The behavioral monitoring system 106 uses the sensor data to determine if any of the triggering conditions have been satisfied. For example, the behavioral monitoring system 106 may generate text from audio data captured by the sensors and search the text for any of the terms or strings of terms that indicate use of offensive, derogatory, and/or otherwise undesirable language. As another example, the behavioral monitoring system 106 may identify motions performed by vehicle riders from image, video and/or motion data. The behavioral monitoring system 106 may then generate a value, such as a vector, representing the motion, and compare the value to a threshold value defined by a triggering condition.

If a triggering condition is determined to be triggered, the behavioral monitoring system 106 executes the set of actions corresponding to the triggering condition. For example, the behavioral monitoring system 106 may transmit a command to the vehicle 102 to modifying an operating mode of sensors implemented within the vehicle 102.

The behavioral monitoring system 106 may also generate an incident report based on the triggered condition. For example, the incident report may identify the vehicle 102, detected undesirable action, sensor data capturing the incident, and the like.

The behavioral monitoring system 106 may also transmit a notification to one or more defined users. For example, the behavioral monitoring system 106 may transmit messages directed to contact identifiers associated with the triggering condition, such as email addresses, phone numbers, etc. The transmitted notifications may be received by a client device 104 of the intended recipient.

Figure 2:
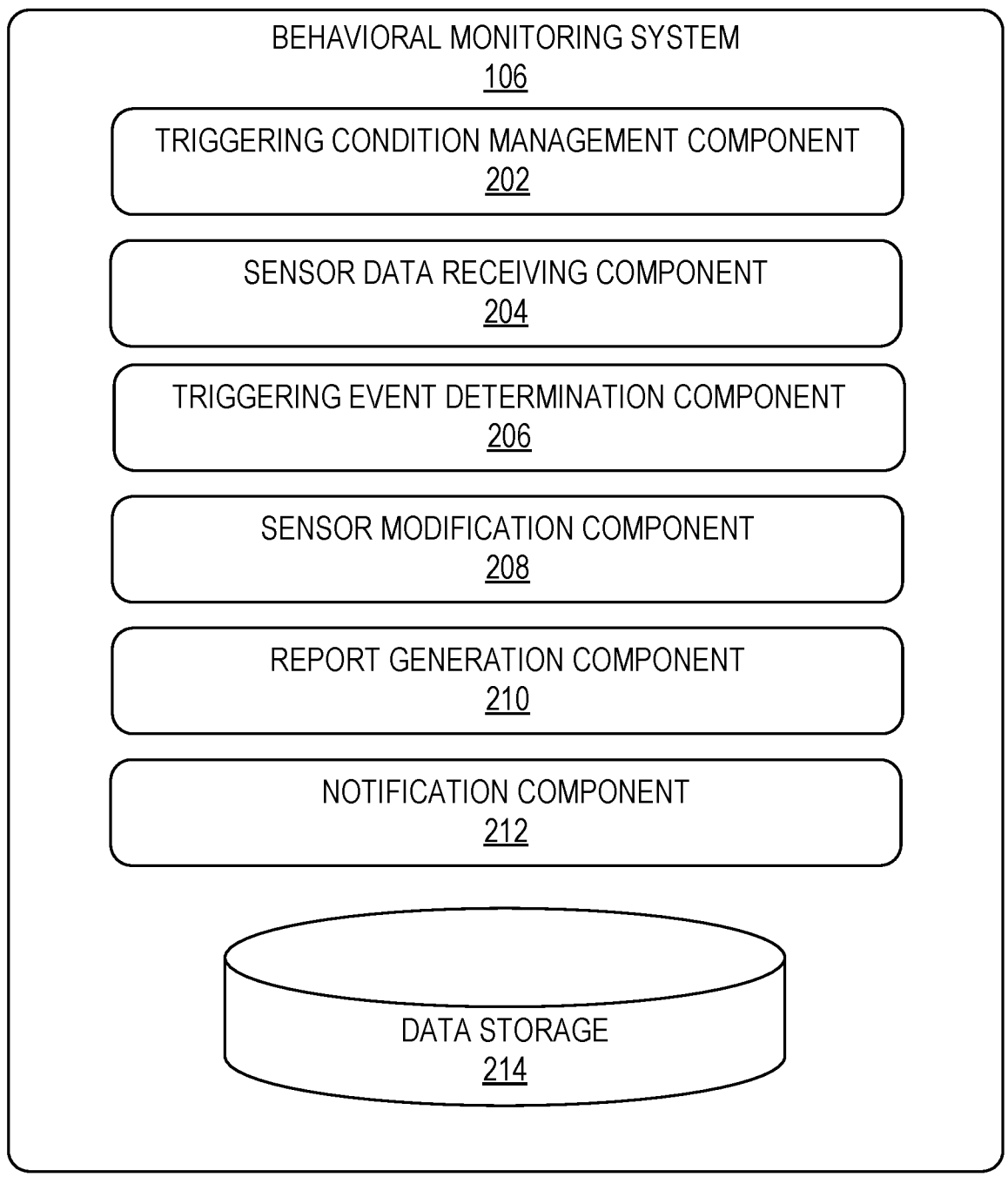
FIG. 2 is a block diagram of a behavioral monitoring system, according to some example embodiments.

FIG. 2 is a block diagram of a behavioral monitoring system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the behavioral monitoring system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the behavioral monitoring system 106 includes a triggering condition management component 202, a sensor data receiving component 204, a triggering event determination component 206, a sensor modification component 208, a report generation component 210, a notification component 212, and a data storage 214.

The triggering condition management component 202 facilitates generation and modification of triggering conditions. For example, triggering condition management component 202 provides a user interface that allows administrators to generate and/or modify the triggering conditions. Each triggering condition defines one or more individual conditions that, if satisfied, indicates occurrence of an undesirable behavior, as well as a corresponding set of response actions to be performed if the triggering condition has been satisfied.

The user interface provided by the triggering condition management component 202 enables administrators to define the triggering conditions, such as by enabling administrators to define a set of terms or strings of terms that, if spoken, indicate use of offensive, derogatory, and/or otherwise undesirable language. Similarly, the behavioral monitoring system 106 enables an administrator to define the types of motions and thresholds to trigger the triggering condition. For example, the user interface may include user interface elements, such as buttons, text boxes, and the like, which an administrator may use to define the triggering conditions.

Similarly, an administrator may use the user interface elements to define corresponding actions to be performed in the event that a triggering condition has been satisfied/triggered. For example, the user interface enables the administrator to define contact identifiers (e.g., email addresses, phone numbers, etc.) to which notifications are to be sent, define actions for generating a incident report, define a modified mode of operation of the sensors in the vehicle 102, and the like.

The triggering condition management component 202 stores the generated triggering conditions in the data storage 214. The stored triggering conditions may be associated with an account and/or fleet identifier that identifies the account, vehicle fleet and/or vehicles 102 to which the triggering conditions are associated. The stored triggering conditions may be accessed from the data storage 214 by the other components of the behavioral monitoring system 106.

The sensor data receiving component 204 receives sensor data from vehicles 102. The sensor data may be gathered by any of a variety of sensors implemented within and/or around a vehicle 102. For example, the sensor data may include video and/or image data captured by image sensors (e.g., cameras, video cameras), audio data captured by audio sensors (e.g., microphones), motion data captured by motion sensors, and the like. The sensor data describes actions performed by rider and/or other users in and/or around the vehicle 102.

The sensor data receiving component 204 provides the sensor data to the other components of the behavioral monitoring system 106 for use in detecting occurrence of undesirable behavior. The sensor data receiving component 204 may also store the sensor data in the data storage 214, where it may be accessed by the other components of the behavioral monitoring system 106. For example, the stored sensor data may be associated with a unique identifier associated with the vehicle 102 from which the sensor data was received. The sensor data may also include timestamp data indicating the time at which the sensor data was captured by the sensors of the vehicle 102 and/or received by the behavioral monitoring system 106.

The triggering event determination component 206 uses the sensor data received by the sensor data receiving component 204 to determine whether any of the triggering conditions have been satisfied. For example, the triggering event determination component 206 may generate text from audio data captured by sensors of a vehicle 102 and search the text for any of the terms or strings of terms included in a triggering condition that indicate use of offensive, derogatory, and/or otherwise undesirable language. As another example, the triggering event determination component 206 may identify motions performed by vehicle riders from image, video and/or or motion data. The triggering event determination component 206 may then generate a value, such as a vector, representing the motion, and compare the value to a threshold value defined by a triggering condition.

In some embodiments, a triggering condition may be based on a combination of individual conditions, such as a combination of detecting specified terms, detecting specified motions, and/or detecting a specified volume level. In these types of embodiments, the triggering event determination component 206 may use the sensor data to determine that each of the individual conditions has been satisfied within a predetermined time window, such as within a 5 second window. For example, the triggering event determination component 206 may use timestamp data associated with the sensor data to determine whether each of the individual conditions was satisfied within the predetermined time window. Accordingly, the triggering condition is satisfied when each of the individual conditions occurred within the predetermined time window, such as a specified term being spoke along with a detected volume above a threshold volume.

The triggering event determination component 206 notifies the other components of the behavioral monitoring system 106 if a triggering condition has been triggered. For example, the triggering event determination component 206 may provide the other components with data identifying the specified triggering condition that is satisfied and/or provide the other components with a command to cause performance of the actions corresponding to the triggering condition.

The sensor modification component 208 causes a modification to an operating mode of sensors in a vehicle 102. In some cases, an administrator or fleet manager may with wish to capture additional or higher quality sensor data to document a detected incident of undesirable behavior. For example, the administrator or fleet manager may with wish to initiate use of sensors, such as cameras, microphones, and the like, to capture sensor data documenting the incident. As another example, the administrator or fleet manager may with wish to increase the quality of the sensor data, such as by increasing the resolution of the optical sensors, audio sensors, and the like. As another example, the administrator or fleet manager may with wish to focus the sensors towards a detected incident, such as by changing the orientation of the optical sensors and/or audio sensors to be directed towards the detected occurrence of the undesirable behavior.

The sensor modification component 208 causes a modification to the operating mode of the sensors in a vehicle 102 based on specifications defined by a triggering condition. For example, the triggering condition may identify the additional sensors to be initiated, modifications to the resolution of the sensors, whether the orientation of the sensors should be adjusted towards the detected occurrence of undesirable behavior, and the like. The triggering condition may also define a length of time that the sensors are to operate in the modified operating mode. The sensor modification component 208 transmits a command to the vehicle 102 to cause the defined modification to the operating mode of the sensors. The sensor modification component 208 may similarly transmit a subsequent command to the vehicle 102 to cause the sensors to return to the previous mode of operations. For example, the sensor modification component 208 may transmit the subsequent command based on the length of time defined by the triggering condition.

The report generation component 210 generates an incident report to document a detected occurrence of undesirable behavior. The incident report may include any of a variety of data defined by an administrator in a triggering condition. For example, an incident report may include data identifying the vehicle 102, the time of the incident, the action that satisfied the triggering condition (e.g., detected terms, action, etc.), as well captured sensor data depicting the incident. The report generating component 210 may store the incident report in the data storage 214 where it may be accessed by an administrator or other authorized user.

The notification component 212 generates and transmits a notification to users defined by the triggering condition. For example, the notification component 212 identifies a contact identifier corresponding to the triggering event. The contact identifier may be defined by an administrator when generating the triggering event. The contact identifier provides contact details for reaching a user designated to receive a notification when then triggering event is triggered. For example, the contact identifier may be an email address, phone number, and the like.

The notification component 212 may then transmit a notification directed to the content identifier. The notification may provide details of the detected incident, such as a description of the undesirable behavior, time, associated vehicle 102, and the like. The notification may also enable a user to access an incident report associated with the detected incident.

Figure 3:
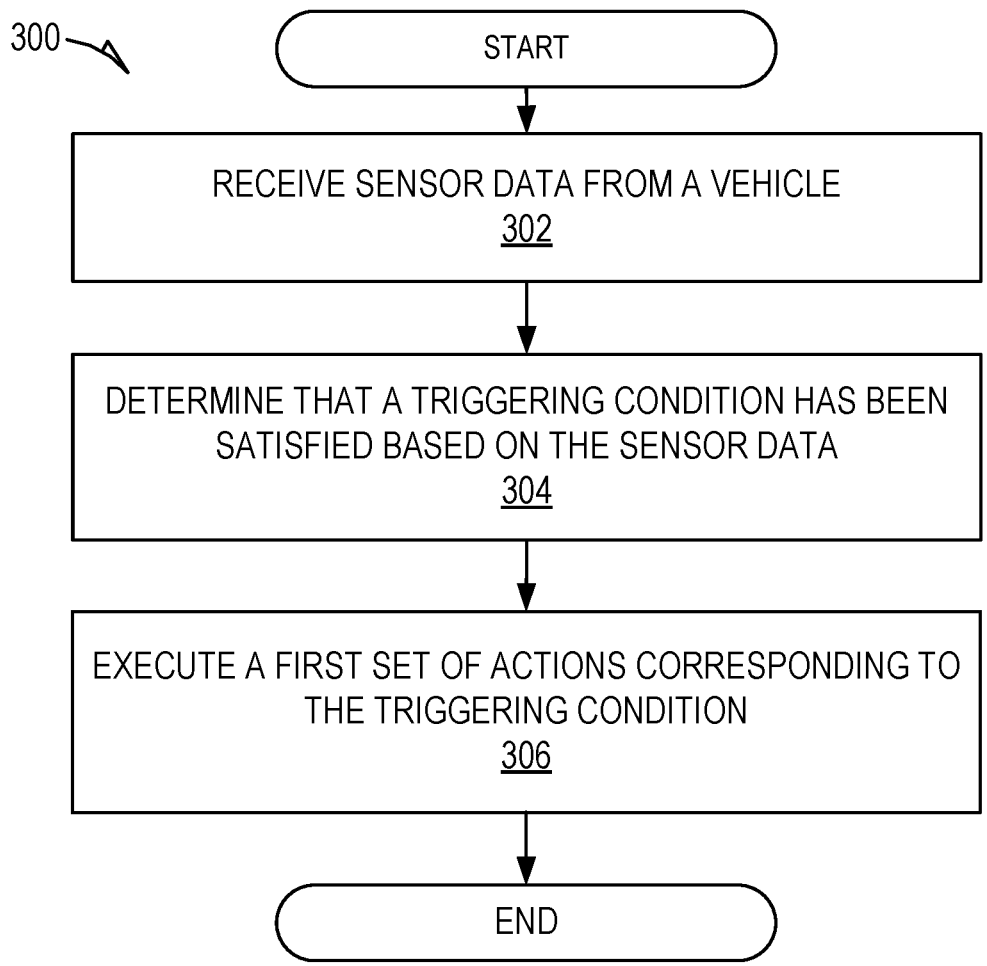
FIG. 3 is a flowchart showing a method for vehicle rider behavioral monitoring, according to some example embodiments.

FIG. 3 is a flowchart showing a method 300 for vehicle rider behavioral monitoring, according to some example embodiments. The method 300 may be embodied in computer readable instructions for execution by one or more processors such that the operations of the method 300 may be performed in part or in whole by the behavioral monitoring system 106; accordingly, the method 300 is described below by way of example with reference thereto. However, it shall be appreciated that at least some of the operations of the method 300 may be deployed on various other hardware configurations and the method 300 is not intended to be limited to the behavioral monitoring system 106.

At operation 302, the sensor data receiving component 204 receives sensor data from a vehicle 102. The sensor data may be gathered by any of a variety of sensors implemented within and/or around a vehicle 102. For example, the sensor data may include video and/or image data captured by image sensors (e.g., cameras, video cameras), audio data captured by audio sensors (e.g., microphones), motion data captured by motion sensors, and the like. The sensor data describes actions performed by rider and/or other users in and/or around the vehicle 102.

At operation 304, the triggering event determination component 206 determines that a triggering condition has been satisfied based on the sensor data. The triggering event determination component 206 uses the sensor data received by the sensor data receiving component 204 to determine whether any of the triggering conditions have been satisfied. For example, the triggering event determination component 206 may generate text from audio data captured by sensors of a vehicle 102 and search the text for any of the terms or strings of terms included in a triggering condition that indicate use of offensive, derogatory, and/or otherwise undesirable language. As another example, the triggering event determination component 206 may identify motions performed by vehicle riders from image, video and/or or motion data. The triggering event determination component 206 may then generate a value, such as a vector, representing the motion, and compare the value to a threshold value defined by a triggering condition.

In some embodiments, a triggering condition may be based on a combination of individual conditions, such as a combination of detecting specified terms, detecting specified motions, and/or detecting a specified volume level. In these types of embodiments, the triggering event determination component 206 may use the sensor data to determine that each of the individual conditions has been satisfied within a predetermined time window, such as within a 5 second window. For example, the triggering event determination component 206 may use timestamp data associated with the sensor data to determine whether each of the individual conditions was satisfied within the predetermined time window. Accordingly, the triggering condition is satisfied when each of the individual conditions occurred within the predetermined time window, such as a specified term being spoke along with a detected volume above a threshold volume.

The triggering event determination component 206 notifies the other components of the behavioral monitoring system 106 if a triggering condition has been triggered. For example, the triggering event determination component 206 may provide the other components with data identifying the specified triggering condition that is satisfied and/or provide the other components with a command to cause performance of the actions corresponding to the triggering condition.

Figure 4:
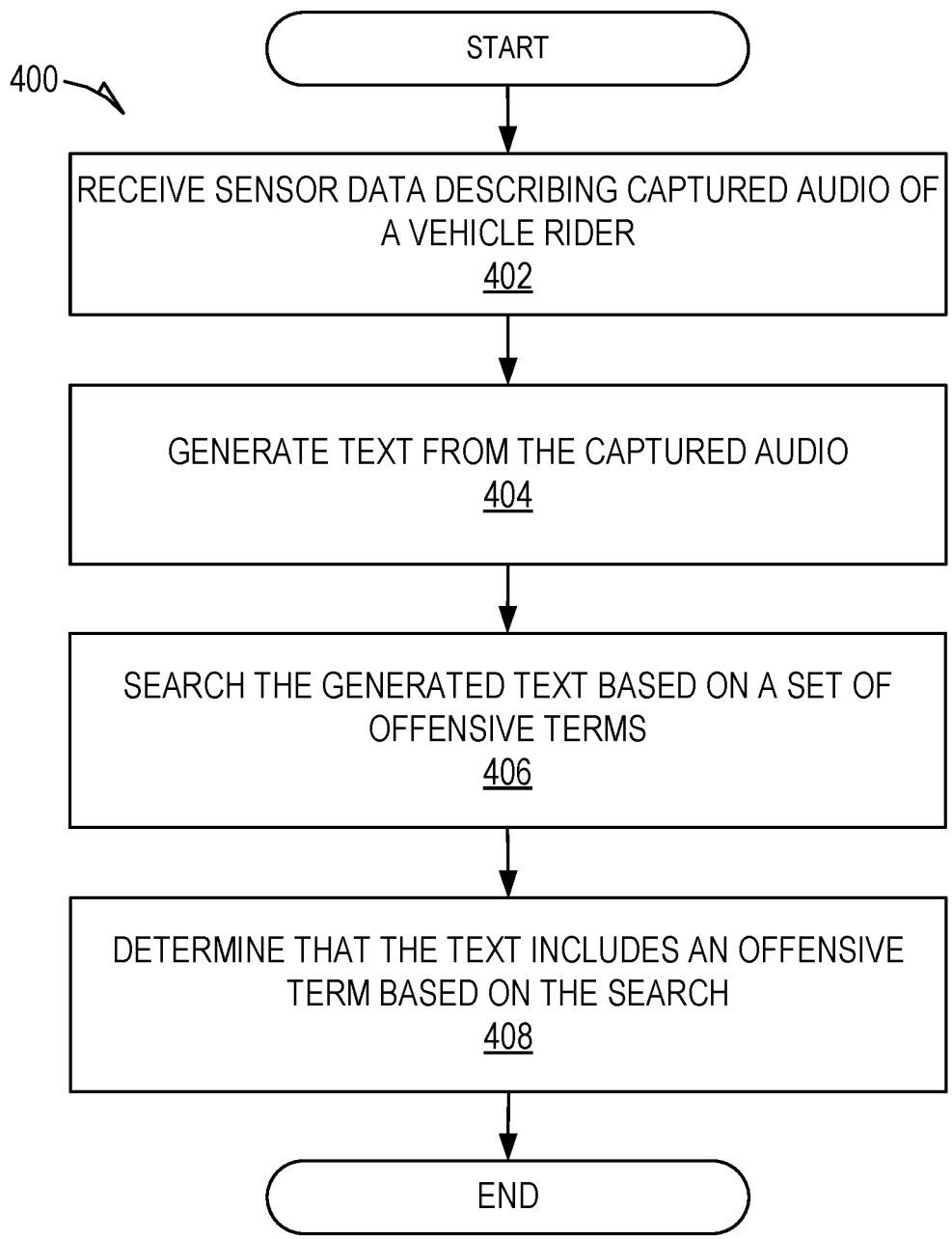
FIG. 4 is a flowchart showing a method for detecting occurrence of an offensive term, according to some example embodiments.

At operation 306, the behavioral monitoring system 106 executes a first set of actions corresponding to the triggering condition. For example, the sensor modification component 208 may cause a modification to an operating mode of sensors in a vehicle 102, the report generation component 210 may generate an incident report to document a detected occurrence of undesirable behavior, and/or the notification component 212 may generate and transmit a notification to users defined by the triggering condition FIG. 4 is a flowchart showing a method 400 for detecting occurrence of an offensive term, according to some example embodiments. The method 400 may be embodied in computer readable instructions for execution by one or more processors such that the operations of the method 400 may be performed in part or in whole by the behavioral monitoring system 106; accordingly, the method 400 is described below by way of example with reference thereto. However, it shall be appreciated that at least some of the operations of the method 400 may be deployed on various other hardware configurations and the method 400 is not intended to be limited to the behavioral monitoring system 106.

At operation 402, the sensor data receiving component 204 receives sensor data describing captured video of a vehicle rider. The sensor data may be gathered by any of a variety of sensors implemented within and/or around a vehicle 102. For example, the sensor data may include video and/or image data captured by image sensors (e.g., cameras, video cameras), audio data captured by audio sensors (e.g., microphones), motion data captured by motion sensors, and the like. The sensor data describes actions performed by rider and/or other users in and/or around the vehicle 102.

At operation 404, the triggering event determination component 206 generates text from the captured audio. The triggering event determination component 206 uses the sensor data received by the sensor data receiving component 204 to determine whether any of the triggering conditions have been satisfied. For example, the triggering event determination component 206 may generate text from audio data captured by sensors of a vehicle 102, and at operation 406, the triggering event determination component 206 searches the generated text based on a set of offensive terms.

Figure 5:
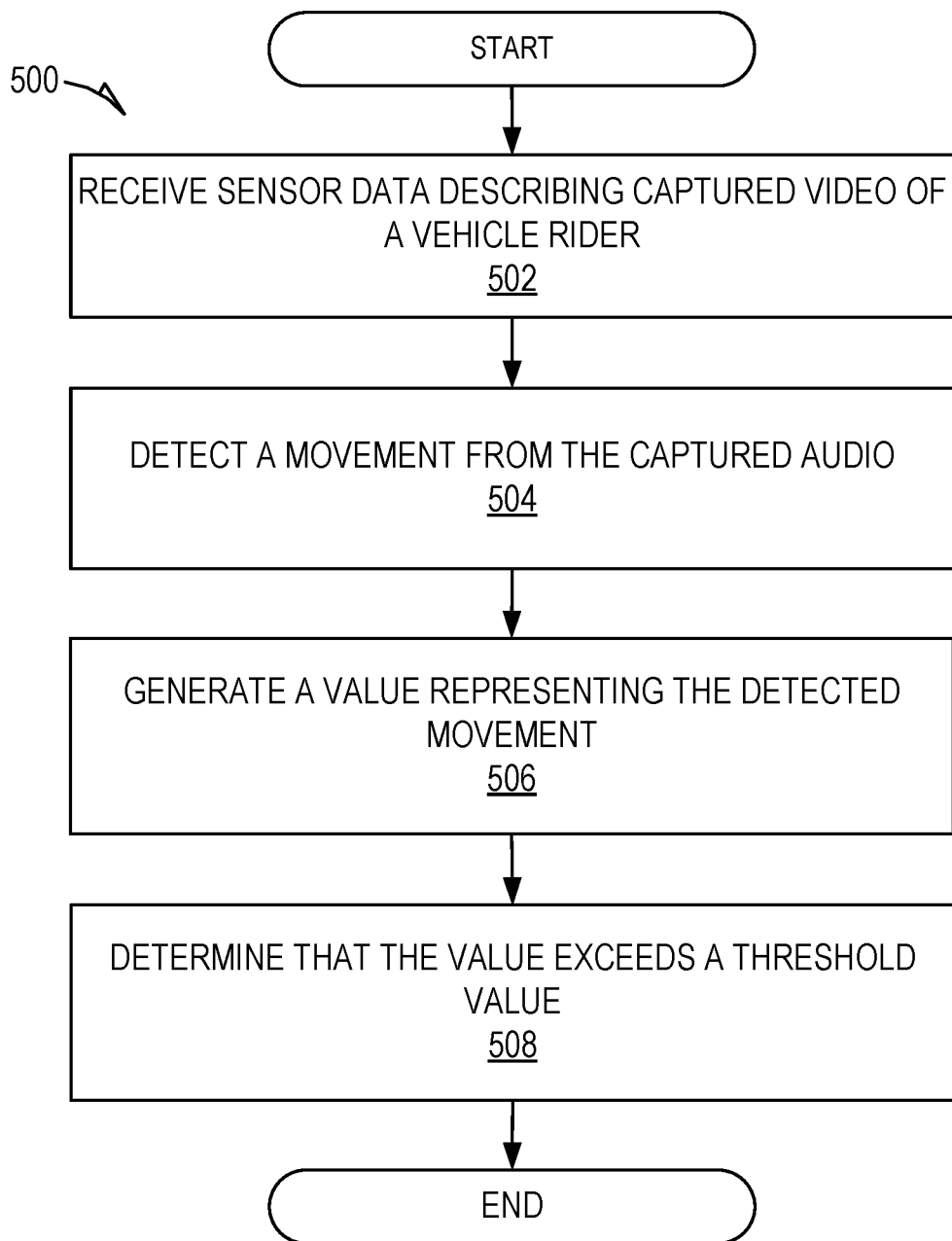
FIG. 5 is a flowchart showing a method for detecting occurrence of an undesirable physical movement, according to some example embodiments.

At operation 408, the triggering event determination component 206 determines that the text includes an offensive term based on the search. For example, the triggering event determination component 206 searches the text for any of the terms or strings of terms included in a triggering condition that indicate use of offensive, derogatory, and/or otherwise undesirable language FIG. 5 is a flowchart showing a method 500 for detecting occurrence of an undesirable physical movement, according to some example embodiments. The method 500 may be embodied in computer readable instructions for execution by one or more processors such that the operations of the method 500 may be performed in part or in whole by the behavioral monitoring system 106; accordingly, the method 500 is described below by way of example with reference thereto. However, it shall be appreciated that at least some of the operations of the method 500 may be deployed on various other hardware configurations and the method 500 is not intended to be limited to the behavioral monitoring system 106.

At operation 502, the sensor data receiving component 204 receives sensor data describing captured video of a vehicle rider. The sensor data may be gathered by any of a variety of sensors implemented within and/or around a vehicle 102. For example, the sensor data may include video and/or image data captured by image sensors (e.g., cameras, video cameras), audio data captured by audio sensors (e.g., microphones), motion data captured by motion sensors, and the like. The sensor data describes actions performed by rider and/or other users in and/or around the vehicle 102.

At operation 504, the triggering event determination component 206 detects a movement from the captured audio. The triggering event determination component 206 uses the sensor data received by the sensor data receiving component 204 to determine whether any of the triggering conditions have been satisfied.

At operation 506, the triggering event determination component 206 generates a value representing the detected movement. For example, the value may be a vector representing the motion.

At operation 508, the triggering event determination component 206 determines that the value exceeds the threshold value. For example, the triggering event determination component 206 compares the value to a threshold value defined by a triggering condition.

Figure 6:
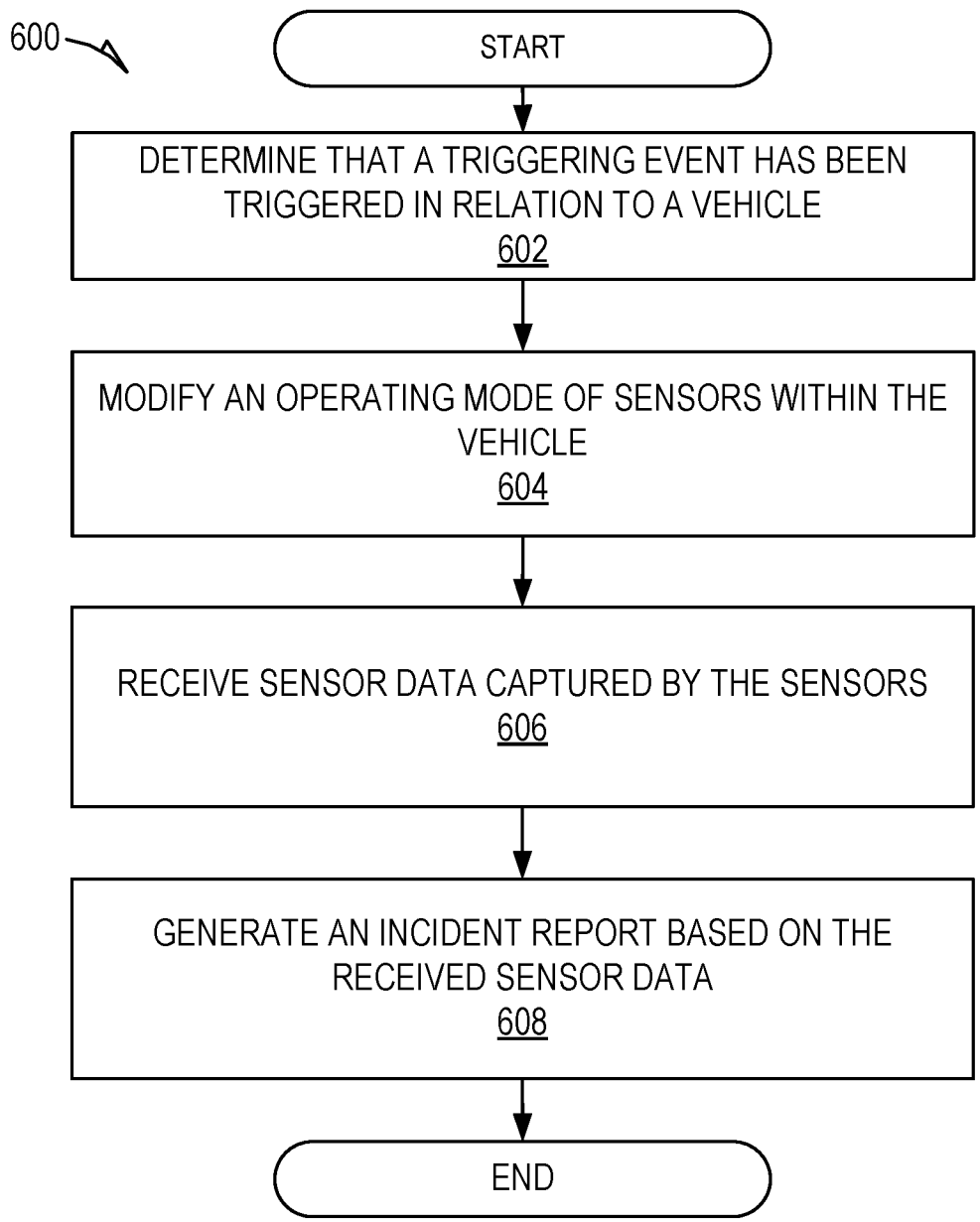
FIG. 6 is a flowchart showing a method for generating an incident report, according to some example embodiments.

FIG. 6 is a flowchart showing a method 600 for generating an incident report, according to some example embodiments. The method 600 may be embodied in computer readable instructions for execution by one or more processors such that the operations of the method 600 may be performed in part or in whole by the behavioral monitoring system 106; accordingly, the method 600 is described below by way of example with reference thereto. However, it shall be appreciated that at least some of the operations of the method 600 may be deployed on various other hardware configurations and the method 600 is not intended to be limited to the behavioral monitoring system 106.

At operation 602, the triggering event determination component 206 determines that a triggering event has been triggered in relation to a vehicle. The triggering event determination component 206 uses sensor data gathered by sensors of the vehicle 102 to determine whether a triggering condition has been satisfied. For example, the triggering event determination component 206 may generate text from audio data captured by the sensors and search the text for any of the terms or strings of terms that indicate use of offensive, derogatory, and/or otherwise undesirable language. As another example, the triggering event determination component 206 may identify motions performed by vehicle riders from image, video and/or or motion data. The triggering event determination component 206 may then generate a value, such as a vector, representing the motion, and compare the value to a threshold value defined by a triggering condition.

At operation 604, the sensor modification component 208 modifies an operating mode of sensors within the vehicle. The sensor modification component 208 causes a modification to the operating mode of the sensors in a vehicle 102 based on specifications defined by a triggering condition. For example, the triggering condition may identify the additional sensors to be initiated, modifications to the resolution of the sensors, whether the orientation of the sensors should be adjusted towards the detected occurrence of undesirable behavior, and the like. The triggering condition may also define a length of time that the sensors are to operate in the modified operating mode. The sensor modification component 208 transmits a command to the vehicle 102 to cause the defined modification to the operating mode of the sensors. The sensor modification component 208 may similarly transmit a subsequent command to the vehicle 102 to cause the sensors to return to the previous mode of operations. For example, the sensor modification component 208 may transmit the subsequent command based on the length of time defined by the triggering condition.

At operation 606, the sensor data receiving component 204 receives sensor data captured by the sensors. The sensor data may be gathered by any of a variety of sensors implemented within and/or around a vehicle 102. For example, the sensor data may include video and/or image data captured by image sensors (e.g., cameras, video cameras), audio data captured by audio sensors (e.g., microphones), motion data captured by motion sensors, and the like. The sensor data describes actions performed by rider and/or other users in and/or around the vehicle 102.

At operation 608, the report generation component 210 generates an incident report based on the received sensor data. The report generation component 210 generates an incident report to document a detected occurrence of undesirable behavior. The incident report may include any of a variety of data defined by an administrator in a triggering condition. For example, an incident report may include data identifying the vehicle 102, the time of the incident, the action that satisfied the triggering condition (e.g., detected terms, action, etc.), as well captured sensor data depicting the incident. The report generating component 210 may store the incident report in the data storage 214 where it may be accessed by an administrator or other authorized user.

Figure 7:
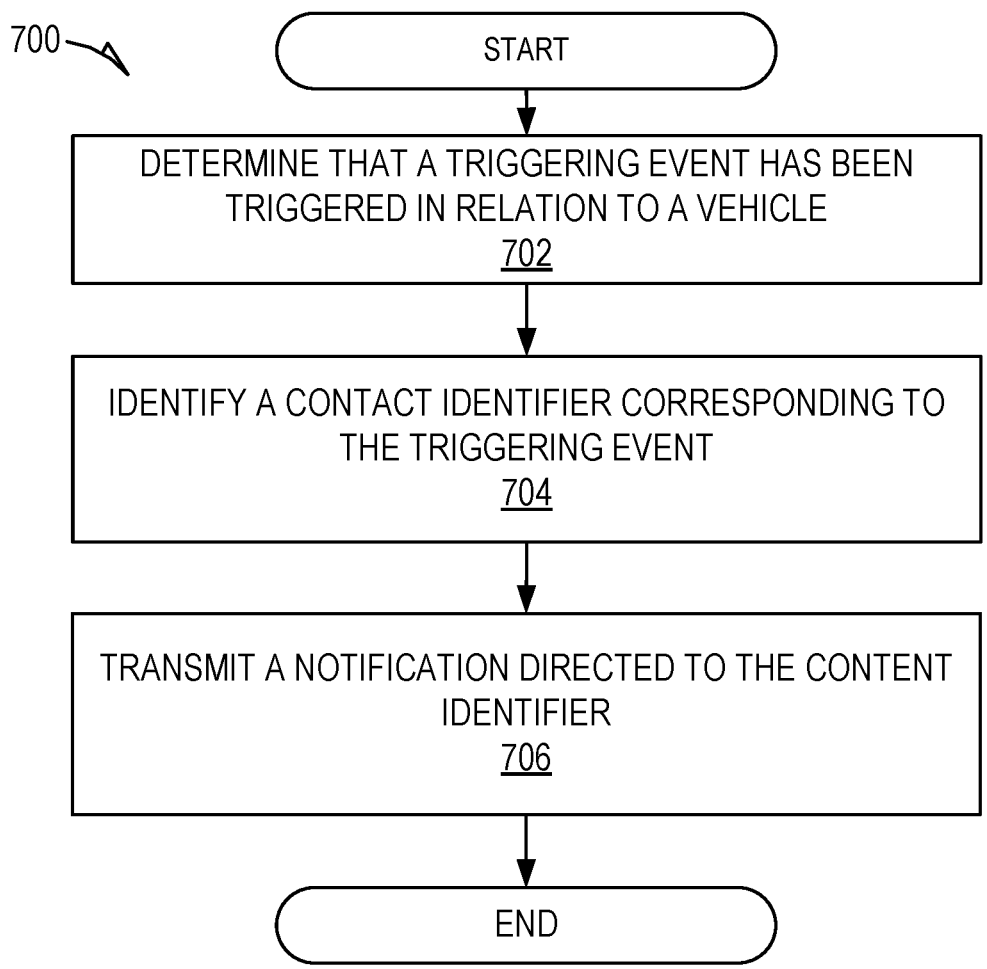
FIG. 7 is a flowchart showing a method for transmitting a notification indicating occurrence of undesirable behavior, according to some example embodiments.

FIG. 7 is a flowchart showing a method 700 for transmitting a notification indicating occurrence of undesirable behavior, according to some example embodiments. The method 700 may be embodied in computer readable instructions for execution by one or more processors such that the operations of the method 700 may be performed in part or in whole by the behavioral monitoring system 106; accordingly, the method 700 is described below by way of example with reference thereto. However, it shall be appreciated that at least some of the operations of the method 700 may be deployed on various other hardware configurations and the method 700 is not intended to be limited to the behavioral monitoring system 106.

At operation 702, the triggering event determination component 206 determines that a triggering event has been triggered in relation to a vehicle 102. The triggering event determination component 206 uses sensor data gathered by sensors of the vehicle 102 to determine whether a triggering condition has been satisfied. For example, the triggering event determination component 206 may generate text from audio data captured by the sensors and search the text for any of the terms or strings of terms that indicate use of offensive, derogatory, and/or otherwise undesirable language. As another example, the triggering event determination component 206 may identify motions performed by vehicle riders from image, video and/or or motion data. The triggering event determination component 206 may then generate a value, such as a vector, representing the motion, and compare the value to a threshold value defined by a triggering condition.

At operation 704, the notification component 212 identifies a contact identifier corresponding to the triggering event. The contact identifier may be defined by an administrator when generating the triggering event. The contact identifier provides contact details for reaching a user designated to receive a notification when then triggering event is triggered. For example, the contact identifier may be an email address, phone number, and the like.

At operation 706, the notification component 212 transmits a notification directed to the content identifier. The notification may provide details of the detected incident, such as a description of the undesirable behavior, time, associated vehicle 102, and the like. The notification may also enable a user to access an incident report associated with the detected incident.

Figure 8:
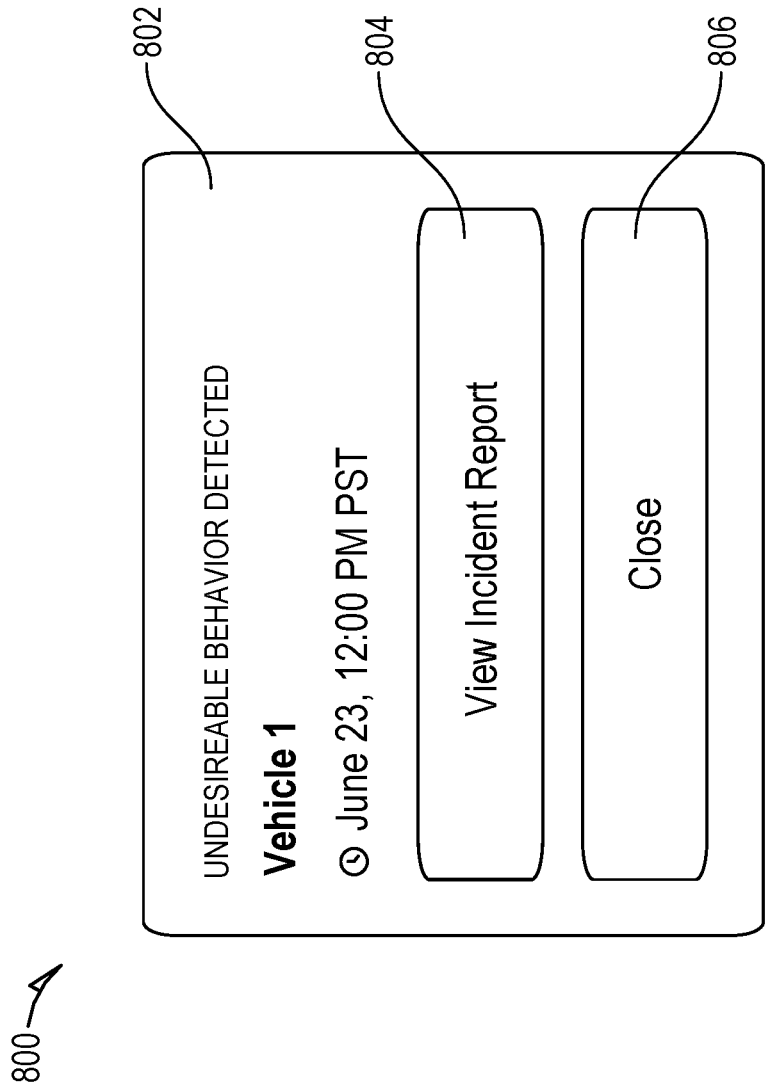
FIG. 8 is a notification indicating occurrence of undesirable behavior, according to some example embodiments.

FIG. 8 is a notification 800 indicating occurrence of undesirable behavior, according to some example embodiments. As shown, the notification 800 includes an informational portion 802 that described the detected incident of undesirable behavior. For example, the informational portion 802 identifies that an undesirable behavior was detected, the vehicle 102 associated with the detected incident, and the time when the incident was detected. The notification 800 also include a view incident report button 804 and a close button 806. The view incident report button 804 enablers a user to select to view an incident report generated based on the detected occurrence of undesirable behavior. For example, selection of the view incident report button 804 causes the user's client device 104 to communicate with the behavioral monitoring system 106 to access the incident report. The client device 104 may then be presented to the user on a display of the client device 104. Alternatively, the user may select the close button 806 to close the notification 800.

Software Architecture

Figure 9:
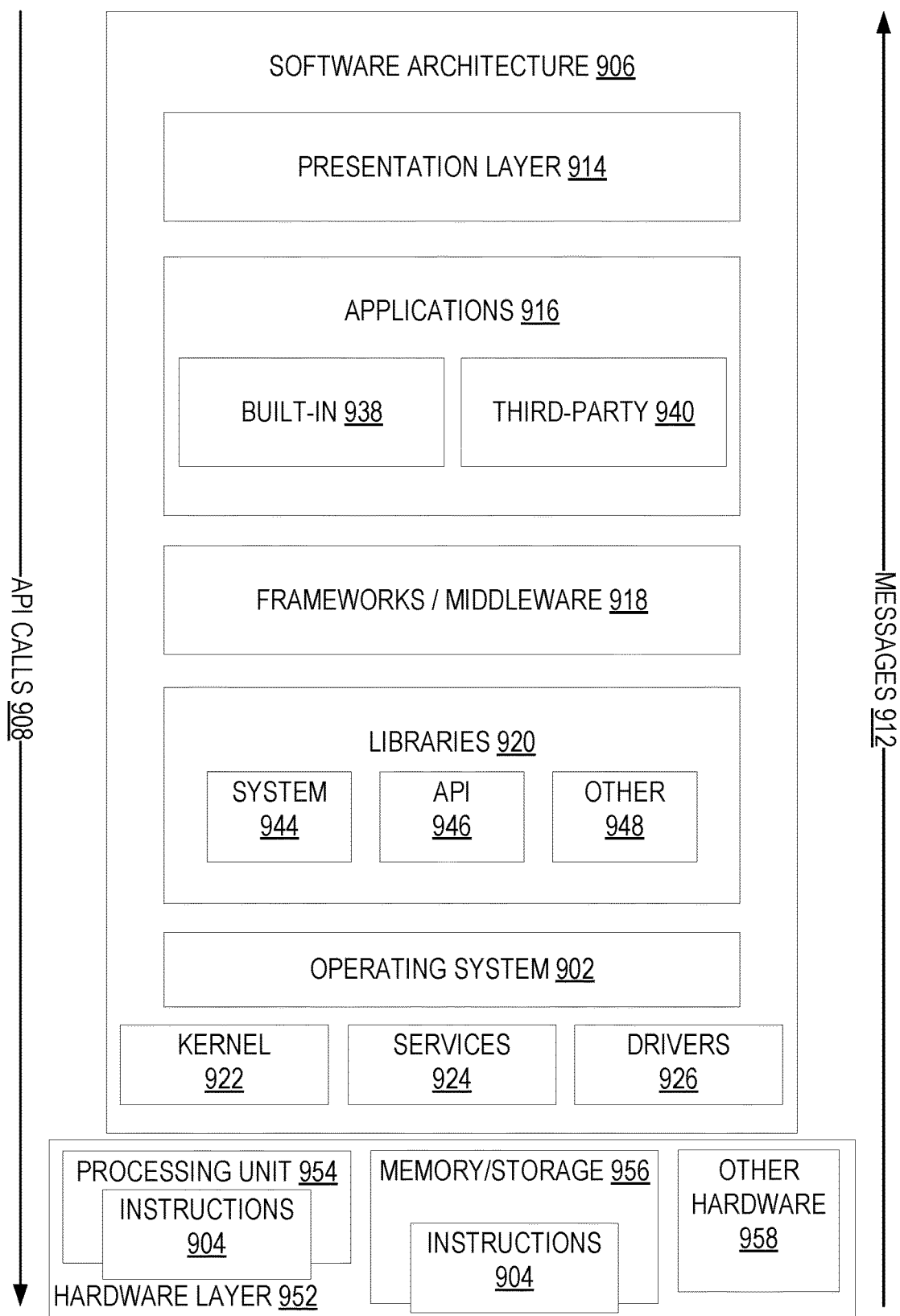
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
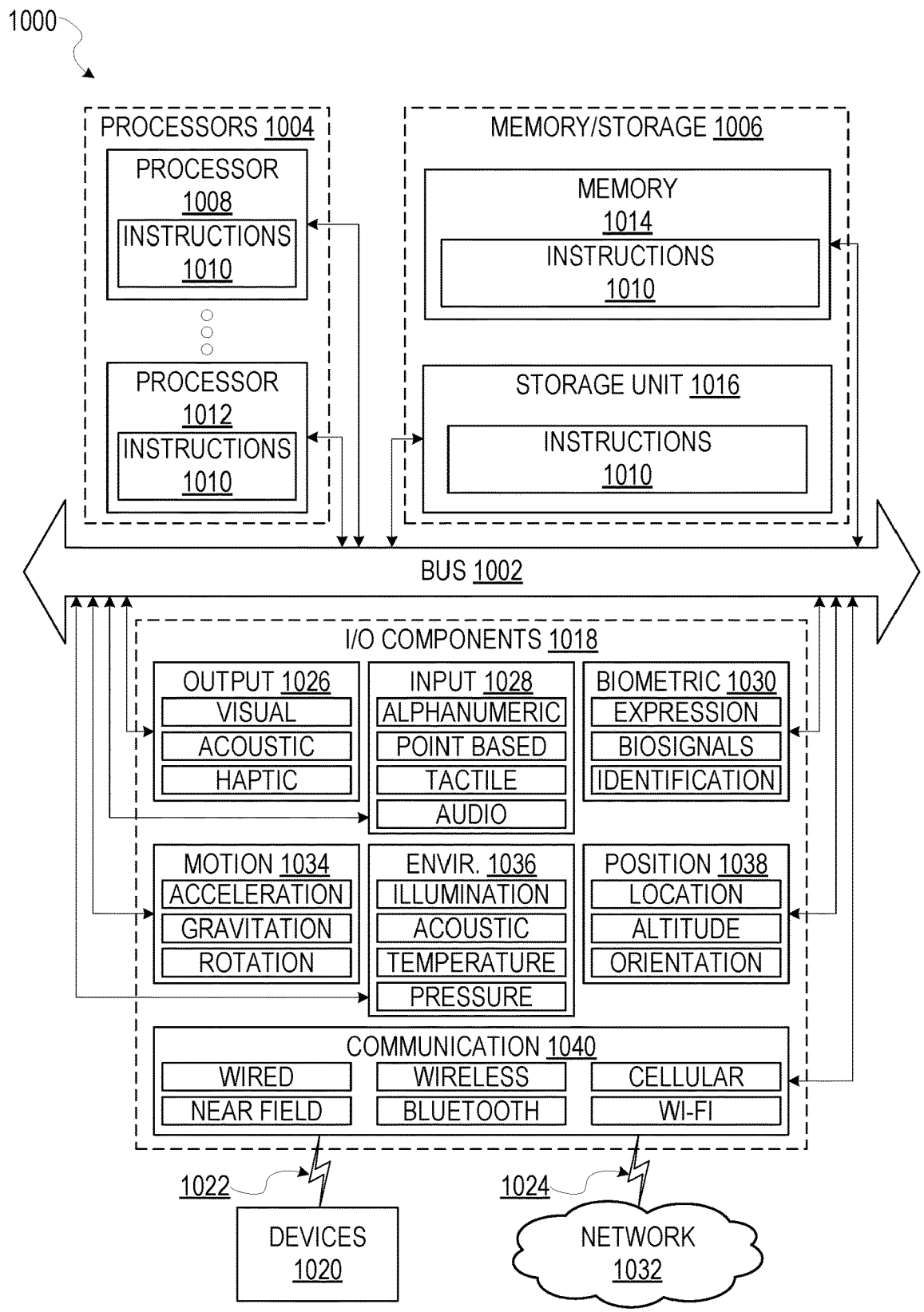
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, net-books, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   receiving sensor data captured by a set of sensors implemented within a vehicle, the sensor data including audio data describing actions of at least a first rider of the vehicle during a first period of time;
   generating, based on the audio data, text representing words spoken by the first rider during the first period of time;
   determining, based on audio data, a volume level of the first rider during the first period of time;
   accessing a first triggering condition for detecting undesirable behavior, the first of triggering condition defining a set of predetermined terms and a threshold volume level;
   in response to determining that the text representing words spoken by the first rider during the first period of time includes at least one predetermined term included in the set of predetermined terms and that the volume level of the first rider during the first period of time meets or exceeds the threshold volume level, determining that the actions of the first rider satisfy the first triggering condition for detecting undesirable behavior; and
   executing a first set of actions corresponding to the first triggering condition.

2. The method of claim 1, wherein determining that the text representing words spoken by the first rider during the first period of time includes at least one predetermined term included in the set of predetermined terms comprises:
   determining that a first sequence of predetermined terms is included in the text, the first sequence of terms including at least two terms in sequential order.

3. The method of claim 1, wherein determining that the actions of the first rider satisfy the first triggering condition comprises:
   detecting, from the sensor data, a first motion performed by a first rider, the sensor data including captured video of the first rider;
   generating a value representing the first motion; and
   determining that the value exceeds a threshold value.

4. The method of claim 1, wherein executing the first set of actions corresponding to the first triggering condition comprises:
   modifying an operating mode of the set of sensors implemented within the vehicle; and
   generating an incident report based on sensor data received from the vehicle after modifying the operating mode of the set of sensors.

5. The method of claim 1, wherein executing the first set of actions corresponding to the first triggering condition comprises:
   transmitting a notification directed to a first contact identifier associated with the first triggering condition.

6. The method of claim 1, further comprising:
   receiving subsequent sensor data captured by the set of sensors implemented within the vehicle, the sensor data describing subsequent actions of the first rider of the vehicle;
   determining, based on the subsequent sensor data, that the subsequent actions of the first rider satisfy a second triggering condition; and
   executing a second set of actions corresponding to the second triggering condition.

7. A system comprising:
   one or more computer processors; and
   one or more computer-readable mediums storing instructions that, when executed by the one or more computer processors, cause the system to perform operations comprising:
   receiving sensor data captured by a set of sensors implemented within a vehicle, the sensor data including audio data describing actions of at least a first rider of the vehicle during a first period of time;
   generating, based on the audio data, text representing words spoken by the first rider during the first period of time;
   determining, based on audio data, a volume level of the first rider during the first period of time;
   accessing a first triggering condition for detecting undesirable behavior, the first of triggering condition defining a set of predetermined terms and a threshold volume level;
   in response to determining that the text representing words spoken by the first rider during the first period of time includes at least one predetermined term included in the set of predetermined terms and that the volume level of the first rider during the first period of time meets or exceeds the threshold volume level, determining that the actions of the first rider satisfy the first triggering condition for detecting undesirable behavior; and
   executing a first set of actions corresponding to the first triggering condition.

8. The system of claim 7, wherein determining that the text representing words spoken by the first rider during the first period of time includes at least one predetermined term included in the set of predetermined terms comprises:
   determining that a first sequence of predetermined terms is included in the text, the first sequence of terms including at least two terms in sequential order.

9. The system of claim 7, wherein determining that the actions of the first rider satisfy the first triggering condition comprises:

detecting, from the sensor data, a first motion performed by a first rider, the sensor data including captured video of the first rider;

generating a value representing the first motion; and determining that the value exceeds a threshold value.

10. The system of claim 7, wherein executing the first set of actions corresponding to the first triggering condition comprises:

modifying an operating mode of the set of sensors implemented within the vehicle; and generating an incident report based on sensor data received from the vehicle after modifying the operating mode of the set of sensors.

11. The system of claim 7, wherein executing the first set of actions corresponding to the first triggering condition comprises:

transmitting a notification directed to a first contact identifier associated with the first triggering condition.

12. The system of claim 7, the operations further comprising:

receiving subsequent sensor data captured by the set of sensors implemented within the vehicle, the sensor data describing subsequent actions of the first rider of the vehicle;

determining, based on the subsequent sensor data, that the subsequent actions of the first rider satisfy a second triggering condition; and executing a second set of actions corresponding to the second triggering condition.

13. A non-transitory computer-readable medium storing instructions that, when executed by one or more computer processors of one or more computing devices, cause the one or more computing devices to perform operations comprising:

receiving sensor data captured by a set of sensors implemented within a vehicle, the sensor data including audio data describing actions of at least a first rider of the vehicle during a first period of time;

generating, based on the audio data, text representing words spoken by the first rider during the first period of time;

determining, based on audio data, a volume level of the first rider during the first period of time;

accessing a first triggering condition for detecting undesirable behavior, the first of triggering condition defining a set of predetermined terms and a threshold volume level;

in response to determining that the text representing words spoken by the first rider during the first period of time includes at least one predetermined term included in the set of predetermined terms and that the volume level of the first rider during the first period of time meets or exceeds the threshold volume level, determining that the actions of the first rider satisfy the first triggering condition for detecting undesirable behavior; and executing a first set of actions corresponding to the first triggering condition.

14. The non-transitory computer-readable medium of claim 13, wherein determining that the text representing words spoken by the first rider during the first period of time includes at least one predetermined term included in the set of predetermined terms comprises:

determining that a first sequence of predetermined terms is included in the text, the first sequence of terms including at least two terms in sequential order.

15. The non-transitory computer-readable medium of claim 13, wherein determining that the actions of the first rider satisfy the first triggering condition comprises:

detecting, from the sensor data, a first motion performed by a first rider, the sensor data including captured video of the first rider;

generating a value representing the first motion; and determining that the value exceeds a threshold value.

16. The non-transitory computer-readable medium of claim 13, wherein executing the first set of actions corresponding to the first triggering condition comprises:

modifying an operating mode of the set of sensors implemented within the vehicle; and generating an incident report based on sensor data received from the vehicle after modifying the operating mode of the set of sensors.

17. The non-transitory computer-readable medium of claim 13, wherein executing the first set of actions corresponding to the first triggering condition comprises:

transmitting a notification directed to a first contact identifier associated with the first triggering condition.

* * * * *